US010288481B2

(12) United States Patent
Day et al.

(10) Patent No.: US 10,288,481 B2
(45) Date of Patent: May 14, 2019

(54) SPECTROMETER FOR GENERATING A TWO DIMENSIONAL SPECTRUM (71) Applicant: Nederlandse Organisatie voor toegepast—natuurwetenschappelijk onderzoek TNO, The Hague (NL)

(72) Inventors: James Peter Robert Day, The Hague (NL); Kees Moddemeijer, The Hague (NL); Daniel Perez Calero, The Hague (NL); Tom Duivenvoorde, The Hague (NL); Marijn Sandtke, The Hague (NL)

(73) Assignee: Nederlandse Organisatie voor toegepast—natuurwetenschappelijk onderzoek TNO, The Hague (NL)

( * ) Notice: Subject to any disclaimer, the term of this patent is extended or adjusted under 35 U.S.C. 154(b) by 255 days.

(21) Appl. No.: 15/104,755

(22) PCT Filed: Dec. 16, 2014

(86) PCT No.: PCT/NL2014/050865
§ 371 (c)(1),
(2) Date: Jun. 15, 2016

(87) PCT Pub. No.: WO2015/093944
PCT Pub. Date: Jun. 25, 2015

(65) Prior Publication Data
US 2017/0016767 A1    Jan. 19, 2017

(30) Foreign Application Priority Data
Dec. 16, 2013    (EP) .................................... 13197479

(51) Int. Cl.
*G01J 3/28*    (2006.01)
*G01J 3/02*    (2006.01)
*G01J 3/18*    (2006.01)

(52) U.S. Cl.
CPC ............. *G01J 3/2823* (2013.01); *G01J 3/021* (2013.01); *G01J 3/0208* (2013.01);
(Continued)

(58) Field of Classification Search
CPC .......... G01J 3/2823; G01J 3/256; G01J 3/291; G01J 3/1809
See application file for complete search history.

(56) References Cited

U.S. PATENT DOCUMENTS 3,658,423 A   4/1972 Elliott
3,922,089 A   11/1975 Danielsson et al.
(Continued)

FOREIGN PATENT DOCUMENTS

EP   1754032 A1   2/2007
EP   1806606 A1   7/2007

OTHER PUBLICATIONS

Mar. 27, 2015—International Search Report and Written Opininon of PCT/NL2014/050865.
(Continued)

*Primary Examiner* — Kara E. Geisel
*Assistant Examiner* — Maurice C Smith
(74) *Attorney, Agent, or Firm* — Banner & Witcoff, Ltd.

(57) ABSTRACT

The present disclosure concerns a spectrometer (10) and method for generating a two dimensional spectrum (S). The spectrometer (10) comprises a main grating (3) and cross dispersion element (2). An imaging mirror (4) is arranged for reflecting and focussing dispersed radiation (R3) from the main grating (3) towards an image plane (IP) for imaging the two dimensional spectrum (S) onto an image plane (IP) of the spectrometer (10). A correction lens (6) is arranged for correcting optical aberrations in the imaging of the two dimensional spectrum (S) in the image plane (IP). The
(Continued)

imaging mirror (4) and correction lens (6) have a coinciding axis of cylindrical symmetry (AS).

20 Claims, 4 Drawing Sheets

(52) U.S. Cl.
CPC ............ *G01J 3/0256* (2013.01); *G01J 3/0291* (2013.01); *G01J 3/18* (2013.01); *G01J 3/1809* (2013.01)

(56) References Cited

U.S. PATENT DOCUMENTS

| | | |
|---|---|---|
| 4,995,721 A | 2/1991 | Krupa et al. |
| 5,018,856 A | 5/1991 | Harnly et al. |
| 5,189,486 A * | 2/1993 | Florek .................. G01J 3/1809 356/328 |
| 5,565,983 A | 10/1996 | Barnard |
| 5,719,672 A * | 2/1998 | Chien .................. G01J 3/1809 356/328 |
| 7,595,875 B1 | 9/2009 | Mitchell |
| 7,804,593 B2 | 9/2010 | Becker-Roβ et al. |
| 2001/0003035 A1* | 6/2001 | Ozarski ................ G02B 5/1852 430/321 |
| 2006/0038997 A1 | 2/2006 | Julian et al. |
| 2008/0144030 A1* | 6/2008 | Chuang .................... G01J 3/02 356/328 |
| 2009/0091753 A1 | 4/2009 | Beardsley et al. |
| 2009/0091754 A1* | 4/2009 | Zhang ...................... G01J 3/02 356/326 |
| 2013/0272650 A1* | 10/2013 | Ishikawa .................. G02B 6/35 385/17 |
| 2014/0268139 A1* | 9/2014 | Smith .................. G01J 3/2846 356/328 |

OTHER PUBLICATIONS

Princeton Instruments, Spectroscopy Group, "Echelle spectrometers provide high resolution over a broad wavelength", 2011 www.princetoninstruments.com.

LLA Instruments GmbH, "High Performance Spectrograph" Echelle spectra analyzer, www.lla-instruments.com; Web page publication: Jan. 22, 2014.

Tripathi, Mayank; Andor Technology, "Echelle Spectrographs—a flexible tool for Spectroscopy" Raman and LIBS Spectroscopy. www.lot-oriel.com/de; Web page publication: Jun. 15, 2007.

\* cited by examiner

SPECTROMETER FOR GENERATING A TWO DIMENSIONAL SPECTRUM

CROSS-REFERENCE TO RELATED APPLICATIONS

This application is a U.S. National Stage application under 35 U.S.C. § 371 of International Application PCT/NL2014/050865 (published as WO 2015/093944 A1), filed Dec. 16, 2014, which claims priority to Application EP 13197479.2, filed Dec. 16, 2013. Benefit of the filing date of each of these prior applications is hereby claimed. Each of these prior applications is hereby incorporated by reference in its entirety.

TECHNICAL FIELD AND BACKGROUND

The present disclosure relates to a spectrometer for generating a two dimensional spectrum.

A spectrometer is an instrument used to probe a property of light as a function of its portion of the electromagnetic spectrum, e.g. for spectrally resolving the light. The term 'light' or 'radiation' as used herein includes all forms of electromagnetic radiation such as visible, infrared and/or ultraviolet radiation. Typically, a spectrometer comprises reflective and/or refractive optics for guiding and shaping the light as well as a dispersion element such as a grating and/or prism for refracting, diffracting and/or dispersing the light in a wavelength dependent angle. Depending on the angle, different spectral components of the light can be imaged at different locations along a spectral axis in an imaging plane of the spectrometer. A sensor can be arranged for detecting spectral components of the light in the imaging plane.

In a typical spectrometer, light is dispersed along a single spectral axis. A disadvantage of such a spectrometer can be that for measuring a large bandwidth of light with a high resolution, a long (one dimensional) detector is needed to capture the spectral image. This can be alleviated by providing a spectrometer that generates a two dimensional spectrum, i.e. projects a two dimensional image wherein light is dispersed along two spectral axes. In this way the spectral image and corresponding detector can be more compact for a relatively high bandwidth and resolution.

EP1754032 B1 described a spectrometer assembly with a spectrometer for generating a radiation spectrum in a first wavelength range of a light source on a detector. The spectrometer comprises an Echelle grating for spectrally dispersing radiation entering the spectrometer assembly in a main dispersion direction. The spectrometer further comprises a dispersion element for separating the orders by means of spectrally dispersing the radiation in a lateral dispersion direction forming an angle with the main dispersion direction of the Echelle grating. The grating and dispersion element are adapted to generate a two dimensional spectrum with a plurality of separated orders. The spectrometer further comprises an imaging optical system for imaging the radiation entering through an entrance slit into the spectrometer assembly in an imaging plane. The spectrometer further comprises a detector array with a two-dimensional arrangement of a plurality of detector elements in the imaging plane.

U.S. Pat. No. 3,658,423 describes an Echelle spectrometer having an entrance aperture, at least one collimating mirror, a prism and an echelle grating which is so mounted to provide rotation in two directions thereby providing adjustment of the vertical and horizontal components of the dispersed energy in the exit focal plane. Optionally, the output energy from the spectrometer through a spectral focal plane passes through separate condensing optics to provide a first image of the grating face. Unfortunately, resolution is limited by optical aberrations.

U.S. Pat. No. 5,565,983 describes another Echelle spectrometer. The spectrometer includes a pair of crossed reflective gratings to effect a spectrally dispersed beam that is focussed to an array detector. The second grating is a plural grating with a surface formed of a first portion and a second portion. The plural grating surface preferably may be contoured to compensate for aberrations in focussing of the beam to the detector. The radiation is reflected from the grating into a further dispersed beam. These rays are thence passed to a concave spherical reflector which focuses the beam by way of an on-axis flat folding mirror and a field flattener lens onto a detector. Unfortunately, the folding mirror may be difficult to align and block a central path of the refracted beams.

There is yet a desire for an improved spectrometer for generating a two dimensional spectrum, in particular with regards to stability and manufacturability.

SUMMARY

A first aspect of the present disclosure provides a spectrometer for generating a two dimensional spectrum, the spectrometer comprising a main grating arranged for spectrally dispersing radiation entering the spectrometer along a main dispersion direction; a cross dispersion element arranged for separating diffraction orders of the main grating by means of spectrally dispersing the radiation in a cross dispersion direction forming an angle with the main dispersion direction of the main grating adapted to generate the two dimensional spectrum with a plurality of separated orders; an imaging mirror arranged for reflecting and focussing dispersed radiation from the main grating towards an image plane for imaging the two dimensional spectrum onto the image plane; and a correction lens arranged for correcting optical aberrations in the imaging of the two dimensional spectrum in the image plane; wherein the imaging mirror and the correction lens have a coinciding axis of cylindrical symmetry.

By using a cross dispersion element for separating diffraction orders, the spectrum can be imaged in a more compact way. By using an imaging mirror for reflecting and focussing dispersed radiation from the main grating towards an image plane, the spectrometer design can be relatively compact. However, the combined dispersion/refraction caused by the main grating and cross dispersion element may result in an angular distribution of radiation impinging the imaging mirror which can lead to optical aberrations in the image plane. By introducing a correction lens, such aberrations can be at least partially counteracted. However, it is found that the ability of the correction lens is sensitive to its exact placement with respect to the other optical elements, in particular the imaging mirror. It is found that inexact positioning of the correction lens during manufacturing can lead to deteriorated properties of the spectrometer. Furthermore, in use, optical components can become relatively shifted e.g. due to thermal or other stress, which can also deteriorate performance.

The inventors find that the conventional spectrometer design for generating two dimensional spectra can be improved by introducing symmetries between specific optical elements that are conventionally not considered. In particular, it is found that by placing the imaging mirror and correction lens such that their axis of cylindrical symmetry coincides, relative placement accuracy of these elements can be improved both during manufacturing and active use of the spectrometer. As will be appreciated, the symmetric arrangement can allow for greater tolerances to e.g. (thermal) shifting and expansion of components. Specifically, due to the symmetric arrangement, the shift and expansion of optical components can occur symmetrically and partly cancel each other out. Furthermore, the imaging mirror and correction lens can be more easily centred with respect to each other e.g. by mechanical means, for example a common cylindrical housing. Alternatively or in addition, the components can be placed from one side against a common contact surface. Especially if the components have the same size, they can be positioned with a flush contact surface from one side. In this way, there can also be a simple yet accurate enclosure of the optical components. Accordingly, by these and other aspects of the present disclosure an improved spectrometer for generating a two dimensional spectrum, in particular with regards to manufacturability and stability, can be provided.

By using a field flattening lens as the correction lens, the image of the two dimensional spectrum in the image plane can be flattened. In this way a flat detector array can be used to capture the spectral image. For example, a detector array with a two-dimensional flat arrangement of a plurality of detector elements can be placed in the imaging plane to register the spectral image. Such a typical flat detector array can be especially useful when the image has been flattened. Depending on the correction lens, it can be advantageous to project an image having a normal vector that is at an angle with respect to the axis of cylindrical symmetry, i.e. the image plane is tilted. Alternatively or in addition to the field flattening lens also other correction lenses can be used, e.g. for correcting other types of aberration and/or for combining their corrective effects. Preferably, when using two or more correction lenses, each has a coinciding axis of cylindrical symmetry with the imaging mirror, e.g. for similar reasons as noted above. By having an optical path of the radiation traverse a correction twice, its corrective function can be enhanced. For example, a correction lens can be placed between the main grating and the imaging mirror to be traversed twice.

By arranging the main grating partially in between the correction lens and the imaging mirror, an angle of incidence of the dispersed radiation onto the cylindrically symmetric imaging mirror can be lowered. By lowering the angle of incidence, optical aberrations of the imaging can be lowered. The more the grating can be positioned in between the correction lens and the imaging mirror, the lower the angle of incidence, and the lower the optical aberrations, particularly for a spherical mirror. On the other hand, the grating can block part of the light between the imaging mirror and correction lens. As a compromise, the main grating can be inserted about half way in between the imaging mirror and correction lens. For similar reasons, by having the main grating arranged to have radiation impinge the main grating with a relatively low angle of incidence in the cross dispersion direction, aberrations can be lowered. For example, an angle of incidence is preferably below 40 degrees, more preferably below 30 degrees, even more preferable below 20 degrees, e.g. between 5 and 30 degrees.

By arranging the main grating in the middle of the axis of cylindrical symmetry along the main dispersion direction, a relatively wide range of diffraction angles can be imaged by the imaging mirror. This may contribute to an improved efficiency of the spectrometer. For example, when light enters the spectrometer beyond a certain acceptance angle and some wavelengths of that light are refracted outside the area of the imaging mirror, efficiency of the spectrometer can be lower. By arranging the main grating with its surface perpendicular to the axis of cylindrical symmetry, the spectrometer can be relatively insensitive to rotation of the grating. Furthermore, placement accuracy of the grating during manufacturing can be improved. Furthermore, relative ease of placement combined with the symmetrical design can contribute to the option of easily replacing the grating, e.g. if it is desired to use the spectrometer for a different wavelength range and/or resolution by using another grating having a different line density and/or groove profile.

Preferably, the main grating is adapted for projecting relatively low diffraction orders onto the image plane. By using lower diffraction orders, a larger part of the spectrum may be covered per order. For example, preferably, diffraction orders fifteen and below are used. The diffraction orders may depend e.g. on the line density of the grating and/or the geometry of the incident radiation. Preferably, the main grating has a line density of at least 150 lines per millimeter, preferably at least 300 lines per millimeter. Alternatively or in addition, relatively low incidence angles are used as detailed above.

Using a prism as the cross dispersion element provides a relatively efficient and simple way of cross-dispersing the radiation and separating otherwise overlapping orders of the diffraction grating. By having the radiation traverse the prism only once losses at the interfaces can be minimized. Furthermore, it allows the prism to be placed outside the path between the grating and imaging mirror thus maintaining the symmetry of the system. Alternative to the prism, also other cross dispersion elements can be used, e.g. a cross dispersion grating.

A second aspect of the present disclosure provides a method for generating a two dimensional spectrum, the method comprising using a main grating for spectrally dispersing radiation along a main dispersion direction; using a cross dispersion element for separating diffraction orders of the main grating by means of spectrally dispersing the radiation in a cross dispersion direction forming an angle with the main dispersion direction of the main grating adapted to generate the two dimensional spectrum with a plurality of separated orders; using an imaging mirror for reflecting and focussing dispersed radiation from the main grating towards an image plane for imaging the two dimensional spectrum onto the image plane; and using a correction lens for correcting optical aberrations in the imaging of the two dimensional spectrum in the image plane; wherein the imaging mirror and the correction lens have a coinciding axis of cylindrical symmetry. The method can provide similar advantages as the spectrometer.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Unless otherwise defined, all terms (including technical and scientific terms) used herein have the same meaning as commonly understood by one of ordinary skill in the art to which this invention belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise. All publications, patent applications, patents, and other references mentioned herein are incorporated by reference in their entirety. In case of conflict, the present specification, including definitions, will control.

When an object has cylindrical symmetry, this means the object can be rotated around an axis by any angle without affecting its appearance. The axis around which the object is cylindrically symmetric is referred to as the axis of cylindrical symmetry. When a lens or mirror is cylindrically symmetric this means it can be arbitrarily rotated around its axis of cylindrical symmetry without affecting its optical function or performance.

An optical aberration is a departure of the performance of an optical system from the predictions of paraxial optics. For example monochromatic aberrations can be caused by the geometry of the lens/mirror and can occur both when light is reflected and when it is refracted. Chromatic aberrations can be caused by the variation of a lens's refractive index with wavelength. Some aberration can be corrected by introducing further optical element, e.g. 'correction lenses' that at least partially counteract the effect of the aberration.

For example, Petzval field curvature describes the optical aberration in which a flat object normal to the optical axis cannot be brought into focus on a flat image plane. A field flattening lens counteracts the Petzval field curvature of an optical system by shifting the focal points of the Petzval surface to lie in the same plane thereby countering the field-angle dependence of the focal length of the system. By flattening the image, a typical flat sensor array can be used in the image plane to correctly register said image.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. The description of the exemplary embodiments is intended to be read in connection with the accompanying drawings, which are to be considered part of the entire written description. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1A:
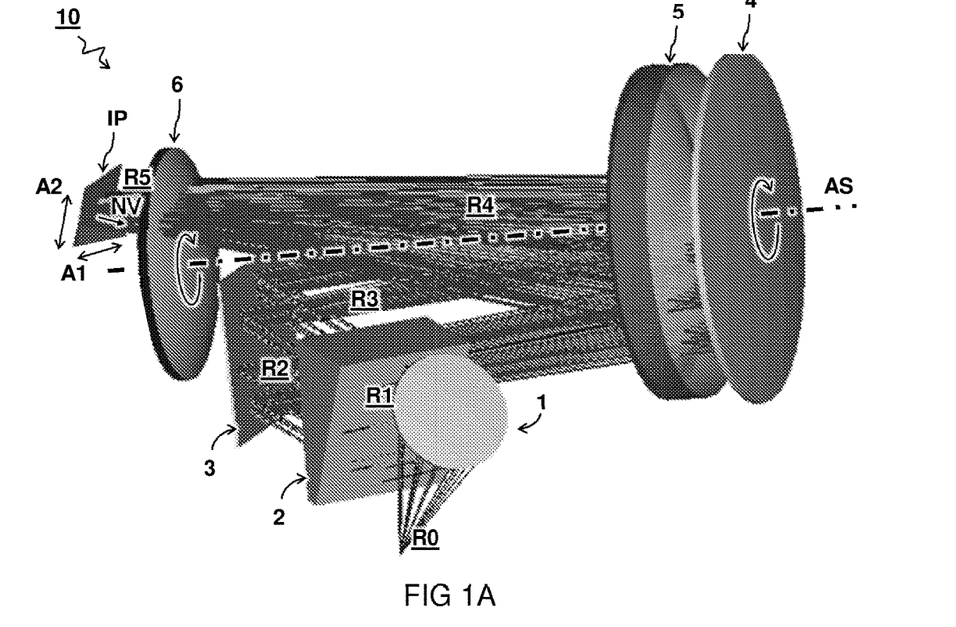
FIG. 1A shows a perspective view of an embodiment of a spectrometer according to the first aspect.
Figure 1B:
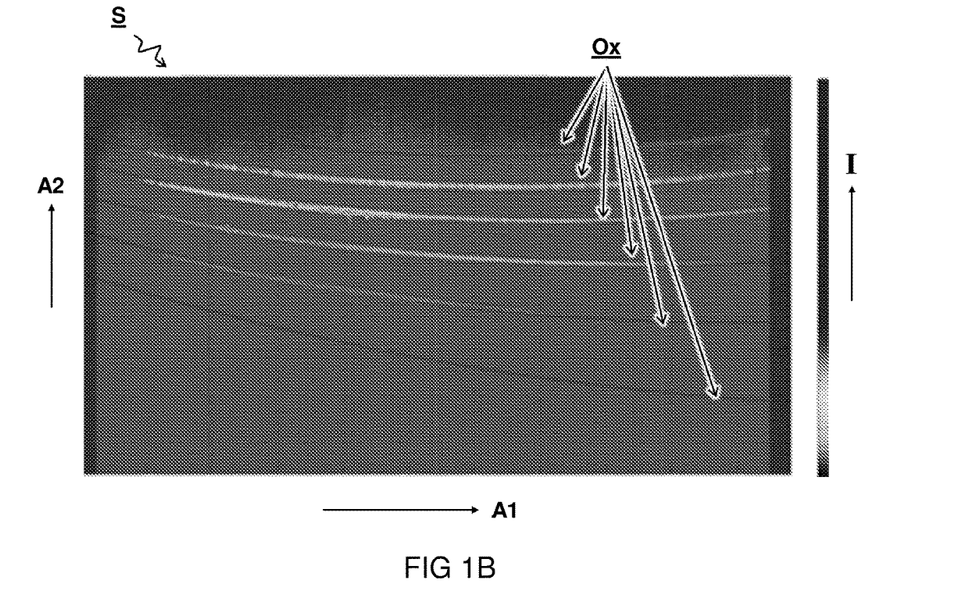
FIG. 1B shows a two dimensional spectrum recorded at the image plane of the spectrometer.
Figure 2A:
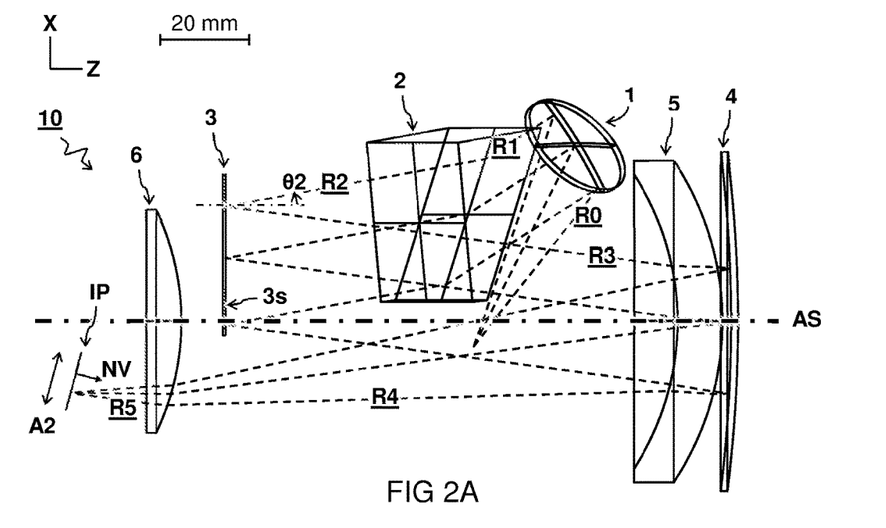
FIGS. 2A and 2B show a respective side and top view of the spectrometer wherein the optical paths of one wavelength and one grating order is shown.
Figure 2B:
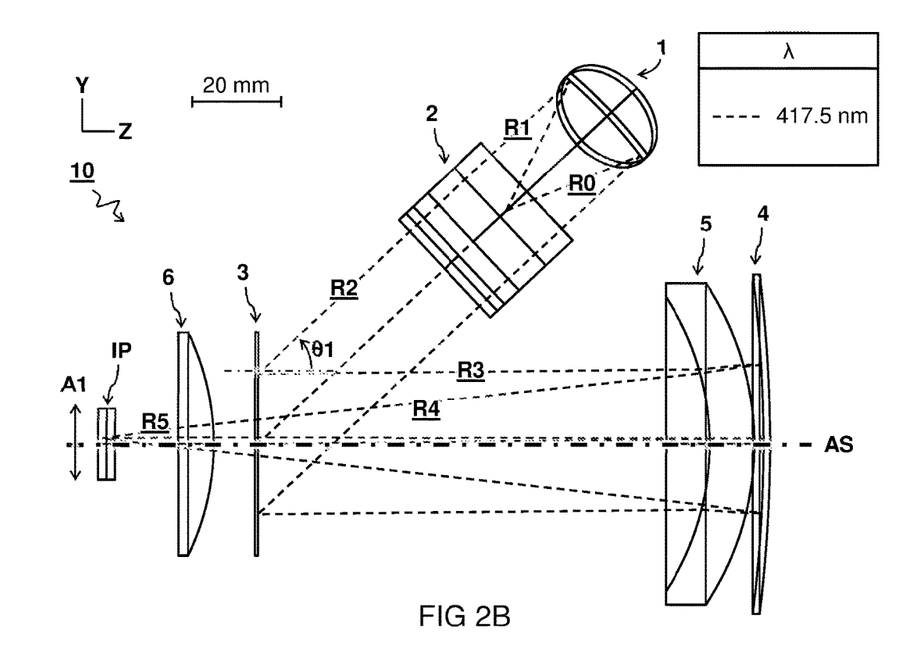
Figure 3A:
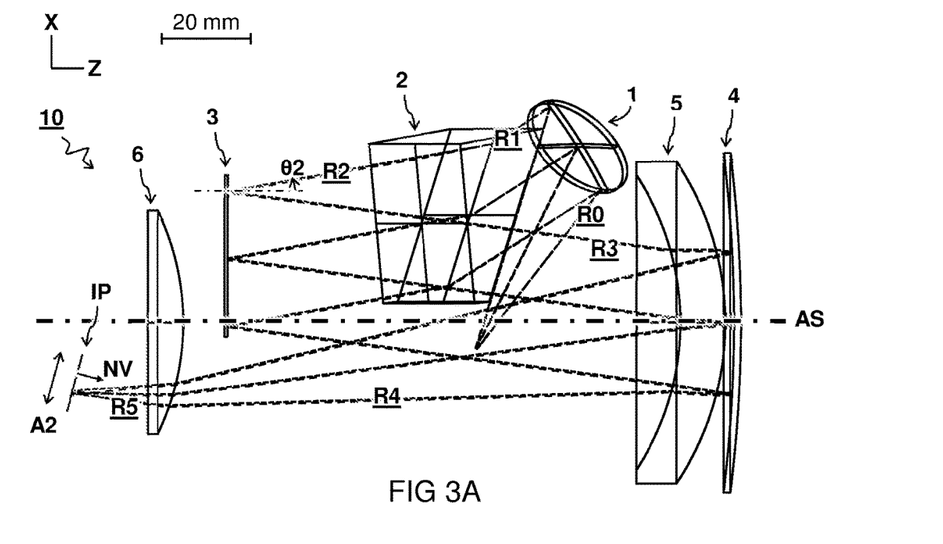
FIGS. 3A and 3B show a respective side and top view of the spectrometer wherein the optical paths of three wavelengths and one grating order is shown.
Figure 3B:
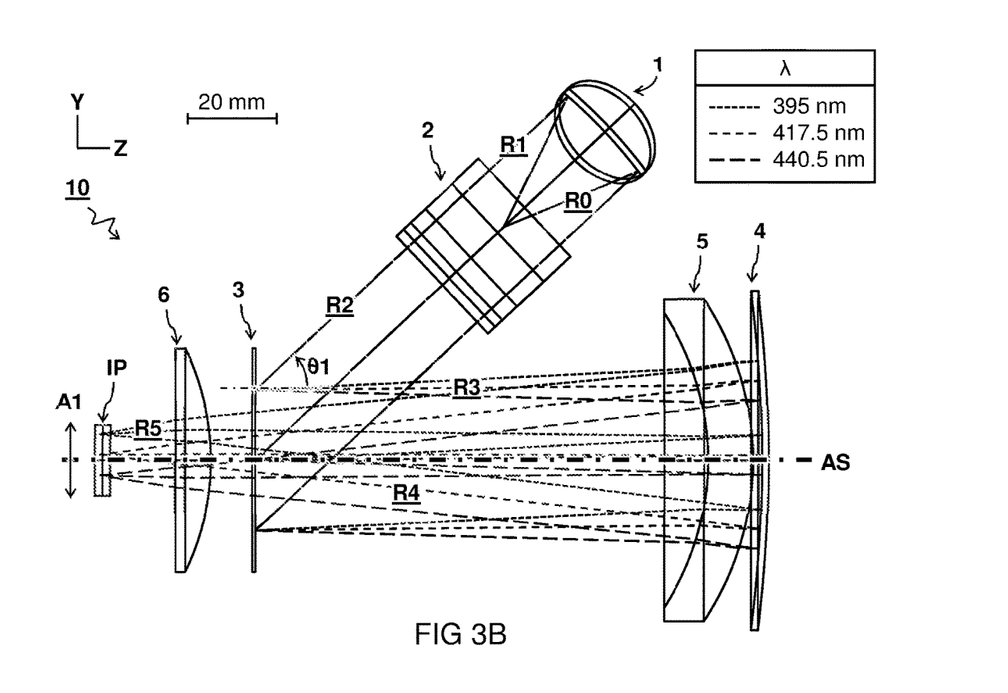

FIG. 1A shows a perspective view of an embodiment of a spectrometer 10. FIGS. 2 and 3 show respective side (XZ) and top (YZ) view of the spectrometer 10. The figures include simulated optical paths of radiation R0-R5 traversing the spectrometer 10. For illustration purposes, FIGS. 2A and 2B show the optical paths of one wavelength ($\lambda$=417.5 nm) and one grating order (grating order 11). FIGS. 3A and 3B show the optical paths of three wavelengths ($\lambda$=395 nm, 417.5 nm, 440.5 nm) and one grating order (grating order 11). FIG. 1B shows an example two dimensional spectrum recorded at the image plane IP of the spectrometer 10.

The spectrometer 10 is arranged for generating a two dimensional spectrum S. The spectrometer 10 comprises a main grating 3 arranged for spectrally dispersing radiation entering the spectrometer along a main dispersion direction A1. The spectrometer 10 comprises a cross dispersion element 2 (e.g. prism) arranged for separating diffraction orders Ox of the main grating 3. The orders can e.g. be separated by means of spectrally dispersing the radiation in a cross dispersion direction A2 forming an angle with the main dispersion direction A1 of the main grating 3. In this way the two dimensional spectrum S can be generated with a plurality of separated orders Ox. Although other angles are possible, the angle between the dispersion directions A1 and A2 is preferably close to ninety degrees, i.e. transverse to one another, to have a good separation of the diffraction orders. The cross dispersion element 2 is preferably placed in a light path R1-R2 before the grating 3. Preferably, the light beam R2 impinging the cross dispersion element 2 is collimated, e.g. by collimator R1.

The spectrometer 10 comprises an imaging mirror 4 arranged for reflecting and focussing dispersed radiation R3 from the main grating 3 towards an image plane IP for imaging the two dimensional spectrum S onto the image plane IP. The imaging of spectrally dispersed radiation involves the converting of an angular distribution into a corresponding (in-focus) spatial distribution in the image plane IP, where a detector (not shown) can be placed to record the spectrum by its spatial distribution. While the imaging of the angularly dispersed radiation is mainly effected by the focussing mirror 4, also other optical components can play a role in determining the imaging position, focus and quality. In particular, the spectrometer 10 comprises a correction lens 6 arranged for correcting optical aberrations in the imaging of the two dimensional spectrum S in the image plane IP. Preferably, the imaging mirror 4 and the correction lens 6 are both cylindrically symmetric. By using an imaging mirror and correction lens that are cylindrically symmetric, rotational shifts of these components do not affect their optical performance. Furthermore, preferably, the imaging mirror 4 and the correction lens 6 have a coinciding axis of cylindrical symmetry AS e.g. to better compensate relative shift in the system In one embodiment, the correction lens 6 is arranged in an optical path between the main grating 3 and the image plane IP. In a further embodiment, the correction lens 6 is arranged in an optical path between the imaging mirror 4 and the image plane IP. Accordingly, the correction lens 6 is arranged for correcting radiation R4 reflected off the imaging mirror 4 towards the image plane IP.

As particularly illustrated by FIGS. 2A and 3A, in one embodiment, the main grating 3 is arranged partially in between the correction lens 6 and the imaging mirror 4. In other words, at least some paths between parts of the imaging mirror 4 and correction lens 6 are blocked by the main grating 3 therein between. Alternatively or in addition, in one embodiment, the main grating 3 is arranged in the middle of the axis of cylindrical symmetry AS along the main dispersion direction A1, e.g. as shown in FIGS. 2B and 3B. It may be surprising that the grating 3 is placed partially in between the optical components 4 and 6 which position may be expected to block optical paths between these components. However, in the two dimensional spectrometer, the path of the radiation follows a zigzag direction along the cross dispersion direction A2 which allows the radiation R4, reflected off the imaging mirror 4, to pass the grating 3 and be projected in the image plane IP. At the same time by placing the grating in the middle, a maximum angle can be provided for the diffraction along the main dispersion direction A1 in either positive or negative diffraction orders. In this way, the efficiency and/or acceptance angle of the spectrometer can be improved, e.g. providing an F-number of f/3.3 or better, e.g. in one embodiment the present design can provide an F-number of f/2 for a slit dimension of 25 μm.

In one embodiment, the main grating 3 is arranged with its surface 3s perpendicular to the axis of cylindrical symmetry AS. This perpendicular arrangement allows a symmetric distribution of positive and negative diffraction orders to be handled by the imaging mirror 4, further improving efficiency.

In one embodiment, the correction lens 6 is a field flattening lens arranged for flattening the image of the two dimensional spectrum S in the image plane IP. The field flattening lens can e.g. correct focal distances to produce a planar image of the spectrum. The lens may be considered part of the imaging system, e.g. providing a desired optical power to said system. In one embodiment, a normal vector NV of the image plane IP is at an angle with respect to the axis of cylindrical symmetry AS. In other words, the image plane IP need not be perpendicular to the axis of cylindrical symmetry AS.

In one embodiment, an optical path of the radiation R3,R4 traverses a correction lens 5 once between the main grating 3 and the imaging mirror 4 and once between the imaging mirror 4 and the image plane IP. By using a correction lens twice, its optical power can be enhanced. Embodiments without lens 5 are also possible.

In one embodiment (not shown), the spectrometer comprises a detector array with a two-dimensional flat arrangement of a plurality of detector elements in the imaging plane IP. It will be appreciated that a flat detector array can be relatively easy to manufacture e.g. compared to a curved detector array. In one embodiment a processor (not shown) is comprised in the instrument to control and read out other components such as the detector array and/or analyse the spectrum.

In one embodiment, the spectrometer 10 comprises a collimating optics 1, arranged for collimating incoming radiation R0. Preferably, the radiation is collimated when traversing the cross dispersion element 2. In one embodiment, the cross dispersion element 2 comprises a prism. In a further embodiment the prism is traversed only once by an optical path of the radiation R1,R2. In one embodiment, the cross dispersion element 2 is placed in a separate arm of the optical setup that guides incoming light towards the main grating 3.

Figure 4:
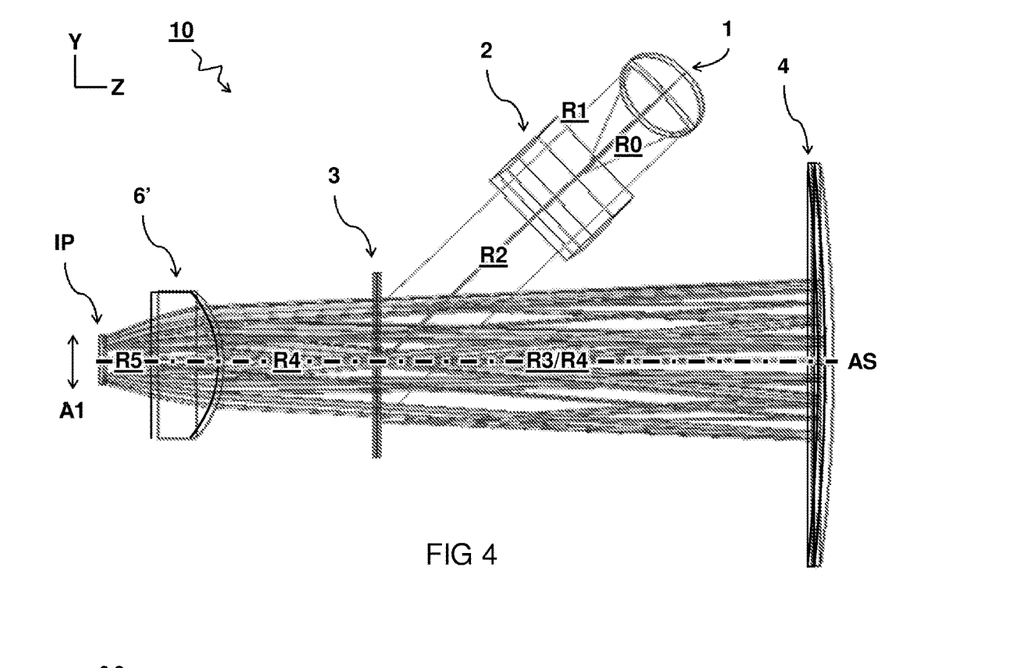
FIG. 4 shows a top view of an alternative embodiment of the spectrometer wherein the optical paths of multiple wavelengths and grating orders is shown.

In one embodiment, the spectrometer 10 comprises a first correction lens 6 and a second correction lens 5, wherein both correction lenses 5,6 have a coinciding axis of cylindrical symmetry AS with the imaging mirror 4. In one embodiment, the first correction lens 6 is arranged (as viewed along the axis of cylindrical symmetry AS) between the grating 3 and the image plane IP while the second correction lens 5 is arranged between the main grating 3 and imaging mirror 4 (viewed along the axis AS). The correction lenses may contribute to correcting, e.g. flattening, the image as well as displacing a position of the image plane IP. Alternative to using multiple correction lenses, also a single correction lens can be used. For example, FIG. 4 shows a top view of a second embodiment wherein a single correction lens 6' is used. As with the first embodiment, the correction lens 6' has a coinciding axis of cylindrical symmetry AS with the imaging mirror 4.

In one embodiment, the main grating 3 is arranged to have radiation R2 impinge the main grating 3 with an angle of incidence $\theta 2$ below 30 degrees in the cross dispersion direction A2, e.g. as illustrated in FIGS. 2A and 3A, preferably even lower, e.g. between 10 and 20 degrees. It will be noted that the angle of incidence $\theta 2$ can determine a zigzag angle of the radiation path R2, R3,R4 which angle is preferably as low as possible for having close to normal incidence on the imaging mirror 4 without the back reflected radiation R4 clipping on the main grating 3. In one embodiment, the main grating 3 is arranged to have radiation R2 impinge the main grating 3 with an angle of incidence $\theta 1$ below 50 degrees in the main dispersion direction A1, e.g. as illustrated in FIGS. 2B and 3B, preferably even lower, e.g. between 10 and 40 degrees. Typically, the lower angle of incidence $\theta 1$ in the main dispersion direction A1 may correspond to lower diffraction orders being used. In one embodiment, the main grating 3 has a line density of at least 150 lines per millimeter, preferably at least 300 lines per millimeter. In one embodiment, the main grating 3 is adapted for projecting diffraction orders Ox below order fifteen onto the image plane IP.

Figure 5:
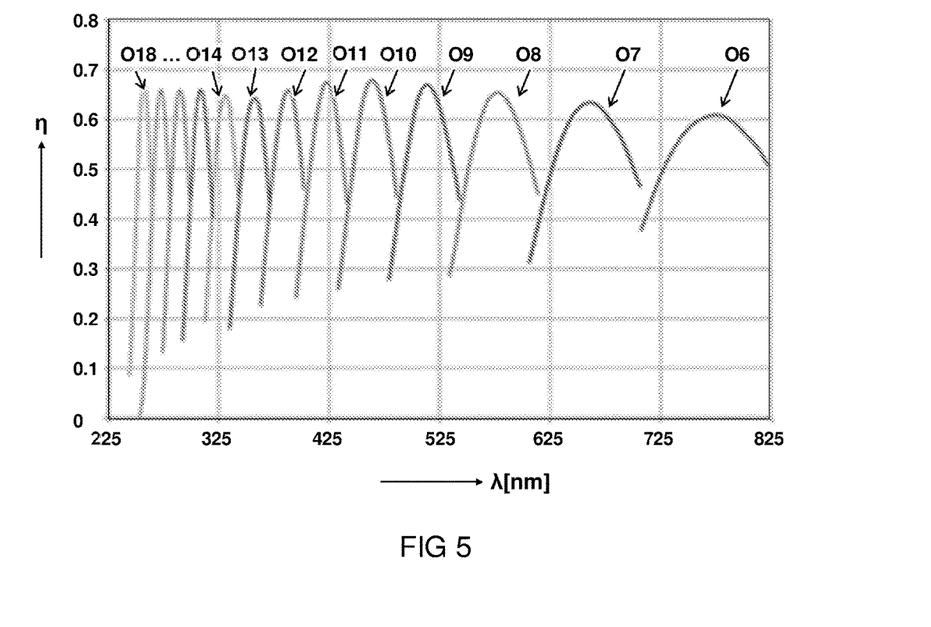
FIG. 5 shows a graph of grating efficiency as a function of wavelength for different diffraction orders.

The present embodiments may be contrasted to conventional 'Echelle' grating based spectrometers which typically feature higher line densities, higher angles of incidence, and/or are used for higher and more diffraction orders. FIG. 5 shows a graph of a typical grating efficiency $\eta$ as a function of wavelength $\lambda$ for different diffraction orders O6 (order 6) ... O18 (order 18). It can be noted that lower diffraction orders typically cover a larger wavelength range than higher diffraction orders and may provide a more sensitive system. Accordingly, it is found advantageous to use the lower diffraction orders, to simplify reconstruction of the spectral features from the two dimensional spectral image.

One aspect of the present disclosure provides a method for generating a two dimensional spectrum S. The method comprises using a main grating 3 for spectrally dispersing radiation along a main dispersion direction A1. The method further comprises using a cross dispersion element 2 for separating diffraction orders Ox of the main grating 3 by means of spectrally dispersing the radiation in a cross dispersion direction A2 forming an angle with the main dispersion direction A1 of the main grating 3 adapted to generate the two dimensional spectrum S with a plurality of separated orders Ox. The method further comprises using an imaging mirror 4 for reflecting and focussing dispersed radiation R3 from the main grating 3 towards an image plane IP for imaging the two dimensional spectrum S onto the image plane IP. The method further comprises using a correction lens 6 for correcting optical aberrations in the imaging of the two dimensional spectrum S in the image plane IP. In the method, the imaging mirror 4 and the correction lens 6 have a coinciding axis of cylindrical symmetry AS.

In one embodiment, the method comprises measuring a first two dimensional spectrum S using a first main grating; replacing the first main grating with a second main grating while keeping the imaging mirror 4, correction lens 6, and image plane IP unchanged; and measuring a second two dimensional spectrum using the second main grating. It will be appreciated that the presently disclosed spectrometer is particularly suitable to allow easy replacement of the grating, e.g. if measuring at another wavelength range is desired using a second main grating having a different line density than the first main grating. Advantageously, in one embodiment all components are kept at the same position and a change in bandwidth and resolution is effected by only replacing the grating. This can provide advantages in terms of manufacturability and use.

With specific reference to the embodiment of FIGS. 1A, 2, and 3, radiation R0 from an origin (e.g. slit or spot) is collimated and reflected by mirror 1 as radiation R1 impinging the prism 2. While traversing the prism 2, the radiation R2 is given a small wavelength dependent angular distribution in the cross dispersion direction A2. Said radiation R2 impinges the grating 3 under an angle of incidence θ1,θ2 and is refracted in a wavelength dependent direction as radiation R3 towards the focusing mirror 4. The radiation R3 passes through a lens 5 before and after impinging the mirror 4. The reflected radiation R4 is focussed by the combined optics 4 and 5 as well as additional lens 6 in the imaging plane IP. The embodiment of FIG. 4 is similar though without the second lens 5.

While example embodiments were shown for spectrometer arrangements, also alternative ways may be envisaged by those skilled in the art having the benefit of the present disclosure for achieving a similar function and result. For example, while the present figures show a reflective main grating 3, alternatively, a non-reflective, i.e. transmissive main grating is used, e.g. wherein radiation R2 is received from a first side (e.g. back side) of the grating and refracted from a second side (e.g. front side) as radiation R3 while passing through (instead of reflecting off) the said transmissive grating. While some of the shown embodiments provide synergetic benefits, such benefits are not necessarily essential. For example, the positional arrangement of the main grating in relation to the imaging mirror as currently described can be varied while still achieving that the imaging mirror and the correction lens have a coinciding axis of cylindrical symmetry.

Furthermore, optical components may be combined or split up into one or more alternative or equivalent components. The various elements of the embodiments as discussed and shown offer certain advantages, such as improved stability and manufacturability. Of course, it is to be appreciated that any one of the above embodiments or processes may be combined with one or more other embodiments or processes to provide even further improvements in finding and matching designs and advantages. It is appreciated that this disclosure offers particular advantages to spectrometers for generating a two dimensional spectrum, and in general could be applied for other spectrometers designs.

While the present systems and methods have been described in particular detail with reference to specific exemplary embodiments thereof, it should also be appreciated that numerous modifications and alternative embodiments may be devised by those having ordinary skill in the art without departing from the scope of the present disclosure. For example, embodiments wherein devices or systems are disclosed to be arranged and/or constructed for performing a specified method or function inherently disclose the method or function as such and/or in combination with other disclosed embodiments of methods or systems. Furthermore, embodiments of methods are considered to inherently disclose their implementation in respective hardware, where possible, in combination with other disclosed embodiments of methods or systems. Furthermore, methods that can be embodied as program instructions, e.g. on a non-transient computer-readable storage medium, are considered inherently disclosed as such embodiment.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. Spectrometer for generating a two dimensional spectrum, the spectrometer comprising
    a main grating arranged for spectrally dispersing radiation entering the spectrometer along a main dispersion direction;
    a cross dispersion element arranged for separating diffraction orders of the main grating by means of spectrally dispersing the radiation in a cross dispersion direction forming an angle with the main dispersion direction of the main grating adapted to generate the two dimensional spectrum with a plurality of separated orders;

an imaging mirror arranged for reflecting and focussing dispersed radiation from the main grating towards an image plane for imaging the two dimensional spectrum onto the image plane; and a correction lens arranged for correcting optical aberrations in the imaging of the two dimensional spectrum in the image plane; wherein the imaging mirror and the correction lens have a coinciding axis of cylindrical symmetry and the main grating is arranged partially in between the correction lens and the imaging mirror.

2. Spectrometer according to claim 1, wherein the main grating is arranged in the middle of the axis of cylindrical symmetry along the main dispersion direction.

3. Spectrometer according to claim 1, wherein the main grating is arranged with its surface perpendicular to the axis of cylindrical symmetry.

4. Spectrometer according to claim 1, wherein the correction lens is a field flattening lens arranged for flattening the image of the two dimensional spectrum in the image plane.

5. Spectrometer according to claim 1, wherein a normal vector of the image plane is at an angle with respect to the axis of cylindrical symmetry.

6. Spectrometer according to claim 1, wherein the spectrometer comprises a first correction lens and a second correction lens, wherein both correction lenses have a coinciding axis of cylindrical symmetry with the imaging mirror.

7. Spectrometer according to claim 1, wherein an optical path of the radiation traverses a second correction lens once between the main grating and the imaging mirror and once between the imaging mirror and the image plane.

8. Spectrometer according to claim 1, further comprising a detector array with a two-dimensional flat arrangement of a plurality of detector elements in the imaging plane.

9. Spectrometer according to claim 1, wherein the cross dispersion element comprises a prism that is traversed only once by an optical path of the radiation.

10. Spectrometer according to claim 1, wherein the main grating is arranged to have radiation impinge the main grating with an angle of incidence below 30 degrees in the cross dispersion direction.

11. Spectrometer according to claim 1, wherein the main grating has a line density of at least 150 lines per millimeter.

12. Spectrometer according to claim 1, wherein the main grating is adapted for projecting diffraction orders below order fifteen onto the image plane.

13. Spectrometer according to claim 11, wherein the line density is at least 300 lines per millimeter.

14. Spectrometer for generating a two dimensional spectrum, the spectrometer comprising:

a main grating arranged for spectrally dispersing radiation entering the spectrometer along a main dispersion direction;

a cross dispersion element arranged for separating diffraction orders of the main grating by means of spectrally dispersing the radiation in a cross dispersion direction forming an angle with the main dispersion direction of the main grating adapted to generate the two dimensional spectrum with a plurality of separated orders;

an imaging mirror arranged for reflecting and focussing dispersed radiation from the main grating towards an image plane for imaging the two dimensional spectrum onto the image plane; and a correction lens arranged for correcting optical aberrations in the imaging of the two dimensional spectrum in the image plane;

wherein the imaging mirror and the correction lens have a coinciding axis of cylindrical symmetry and the main grating is arranged in the middle of the axis of cylindrical symmetry along the main dispersion direction.

15. Spectrometer according to claim 14, wherein the main grating is arranged with its surface perpendicular to the axis of cylindrical symmetry.

16. Spectrometer according to claim 14, wherein the correction lens is a field flattening lens arranged for flattening the image of the two dimensional spectrum in the image plane.

17. Spectrometer for generating a two dimensional spectrum, the spectrometer comprising:

a main grating arranged for spectrally dispersing radiation entering the spectrometer along a main dispersion direction;

a cross dispersion element arranged for separating diffraction orders of the main grating by means of spectrally dispersing the radiation in a cross dispersion direction forming an angle with the main dispersion direction of the main grating adapted to generate the two dimensional spectrum with a plurality of separated orders;

an imaging mirror arranged for reflecting and focussing dispersed radiation from the main grating towards an image plane for imaging the two dimensional spectrum onto the image plane; and a first correction lens arranged for correcting optical aberrations in the imaging of the two dimensional spectrum in the image plane; and a second correction lens, wherein an optical path of the radiation traverses the second correction lens once between the main grating and the imaging mirror and once between the imaging mirror and the image plane.

18. Spectrometer of claim 17, wherein the imaging mirror and the correction lens have a coinciding axis of cylindrical symmetry.

19. Spectrometer according to claim 18, wherein a normal vector of the image plane is at an angle with respect to the axis of cylindrical symmetry.

20. Spectrometer of claim 18, wherein both the first and second correction lens have a coinciding axis of cylindrical symmetry with the imaging mirror.

* * * * *